Oct. 31, 1950     H. F. STOCK     2,527,687

FEED CONVEYER FOR DOUGHNUT MACHINES

Filed Dec. 12, 1949     3 Sheets-Sheet 1

INVENTOR
HAROLD F. STOCK
BY *Liverance and Van Antwerp*
ATTORNEYS

Oct. 31, 1950 H. F. STOCK 2,527,687
FEED CONVEYER FOR DOUGHNUT MACHINES
Filed Dec. 12, 1949 3 Sheets-Sheet 2

INVENTOR
HAROLD F. STOCK
BY Liverance and
Van Antwerp
ATTORNEYS

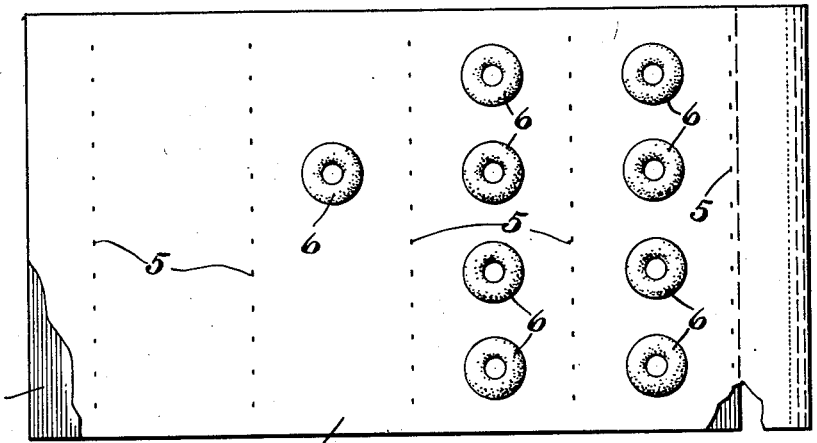
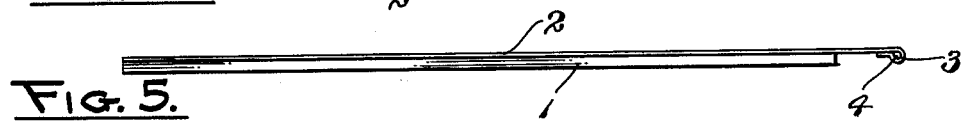
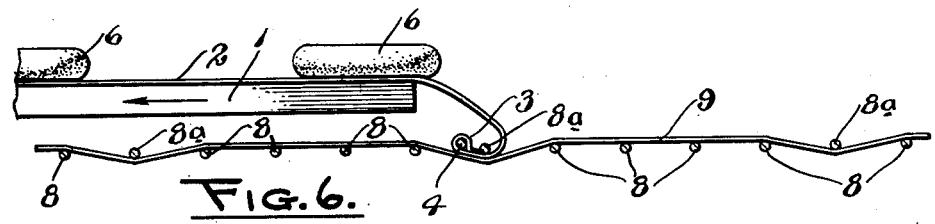
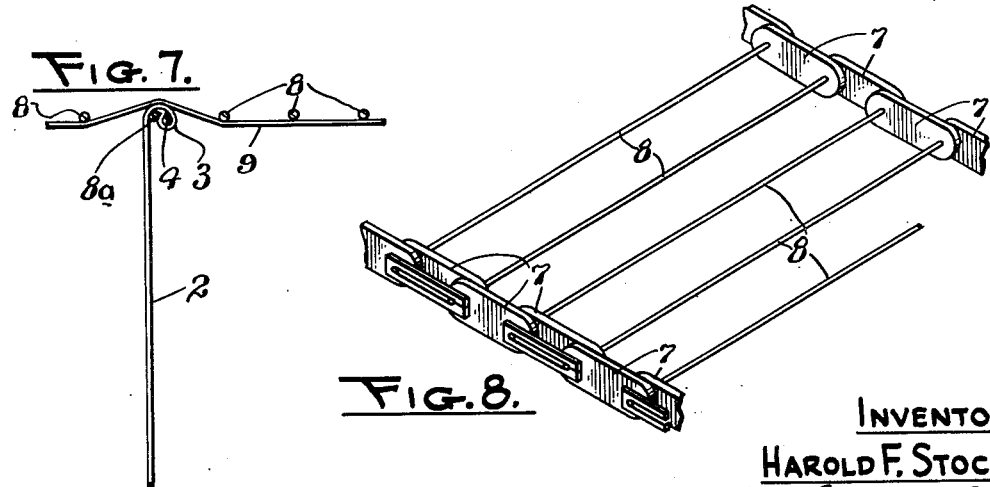

Patented Oct. 31, 1950

2,527,687

UNITED STATES PATENT OFFICE 2,527,687

FEED CONVEYER FOR DOUGHNUT MACHINES

Harold F. Stock, Hillsdale, Mich., assignor to F. W. Stock & Sons, Inc., Hillsdale, Mich., a corporation of Michigan Application December 12, 1949, Serial No. 132,484

9 Claims. (Cl. 99—407)

The present invention relates to a novel mechanism for feeding raised doughnuts to a cooking tank containing melted fat at high temperature, into which the raised doughnuts are delivered.

With raised doughnuts after the doughnuts have been formed from suitable ingredients, they must be given a time in which to raise, that is, have chemical action take place within the doughnuts which produces gases to thoroughly permeate the doughnuts and enlarge and raising them to greater size. Other doughnuts, upon being cut from the materials used, are dropped directly into the high temperature liquid grease or fat for cooking, and the formation of the gases and enlarging of the doughnuts takes place during cooking. Raised doughnuts, however, have such gas formation, and enlargement of the doughnuts takes place before delivery to the cooking liquid. The present invention is directed to a novel, practical and very useful mechanism whereby such doughnuts may be initially raised, and these quickly and efficiently delivered to the cooking liquid after they have reached proper condition.

Figure 1:
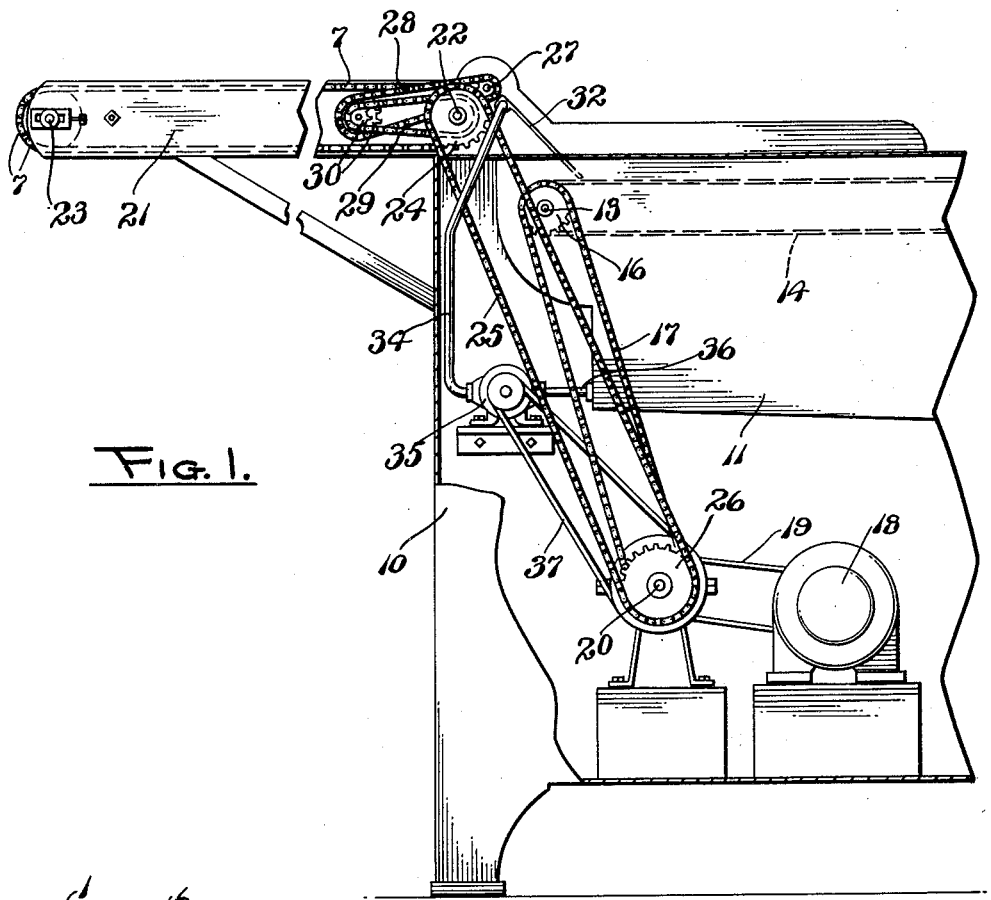
Figure 2:
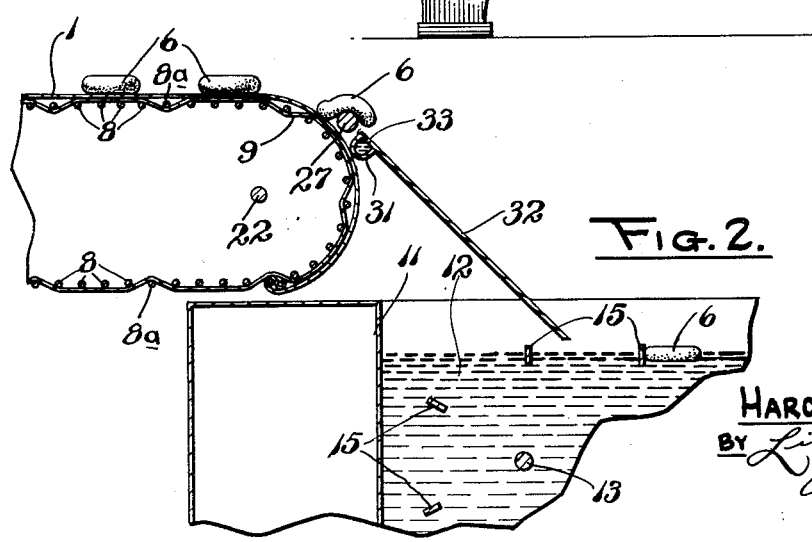
Figure 3:
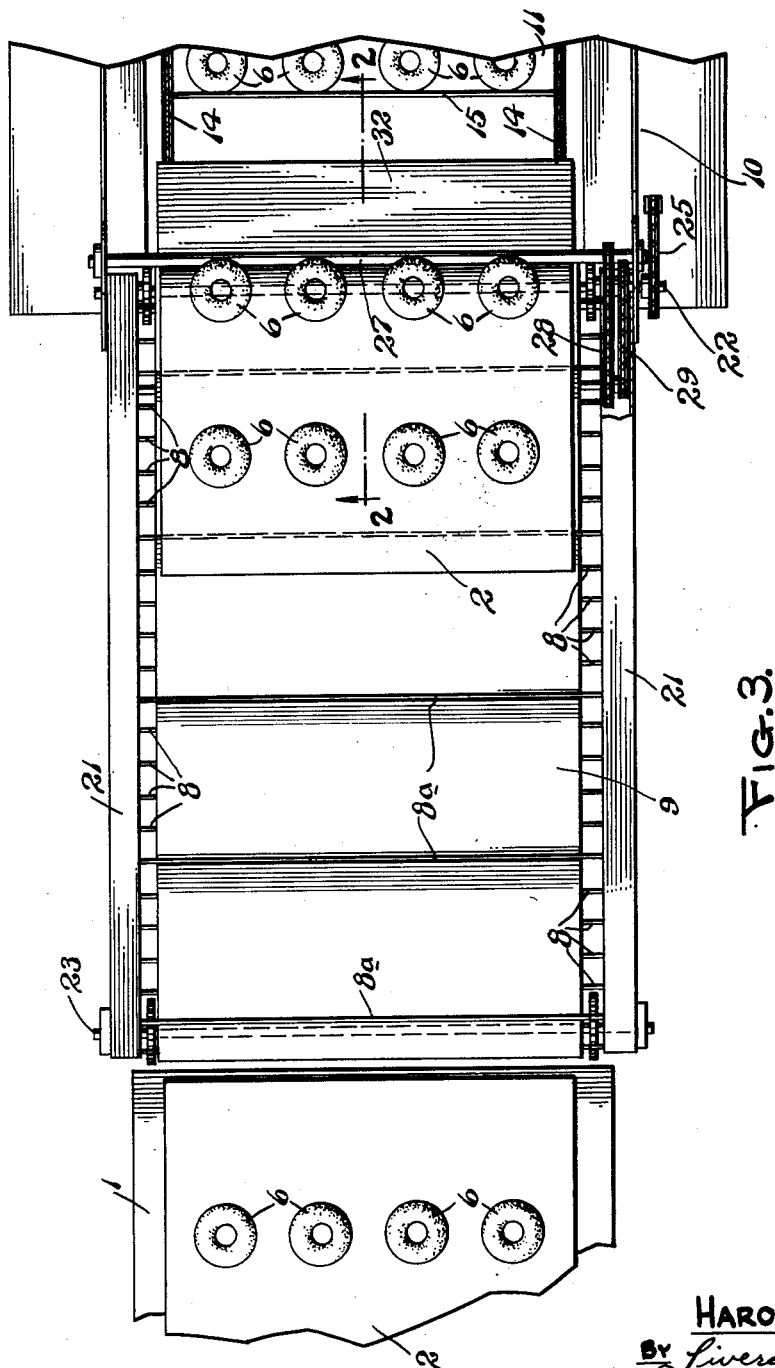

An understanding of the invention may be had from the following description, taken in connection with the accompanying drawings, in which Fig. 1 is a partial side elevation, with parts broken away, and shown in vertical section, of the doughnut feeding or delivering mechanism of my invention, Fig. 2 is a fragmentary enlarged vertical section substantially on the plane of line 2—2 of Fig. 3, Fig. 3 is a plan view, Fig. 4 is a plan view, with some parts broken away, of the raised doughnut carrying apron and the support thereunder, a large number of which are used, such apron being used to place thereupon at proper positions, the doughnuts before raising takes place and leave them until the raising is completed, Fig. 5 is an elevation thereof, Fig. 6 is a fragmentary side elevation, showing one end of an apron or carrier of such raised doughnuts connected with the conveyor which carries them to the cooking tank of the machine, Fig. 7 is a similar view, illustrating the lower run of the conveyor after the doughnuts carried on an apron have been delivered, and Fig. 8 is a fragmentary view of a portion of an endless conveyor chain to which such aprons are successively attached and later detached.

Like reference characters refer to like parts in the different figures of the drawings.

In the preparation of the doughnuts for cooking, an under support or pallet 1 of rectangular shape, which may be of any suitable material such as a wood panel, fiber board or the like, has placed thereover a flexible doughnut carrier 2 of fabric which, at one end, is returned back upon itself to form a loop 3, in which a rod 4 is located, such end of the fabric section or apron 2 normally tending by gravity to drop below the under support 1. The apron 2 is transversely divided into sections by transverse markings 5 parallel to and spaced from each other. The widths of the sections between successive transverse boundaries 5 thereof are equal. Transversely of the apron in each of said sections, a plurality of the doughnuts 6 are placed, approximately equally spaced from the boundary lines 5 at the opposite side edges of said sections. The number of such doughnuts across the apron in each section may be varied, the four shown in section in Fig. 4 being for illustrative purposes only.

The doughnuts are shaped to form and are placed upon the aprons underneath which are the substantially rigid pallet supports 1 and left until their raising has taken place. In practice there will be a large number of the doughnuts carrying aprons 2 and individual under supports, one for each apron.

When the doughnuts are to be delivered to the cooking tank of a doughnut machine, an apron is connected at its end carrying the rod 4 to a suitable endless conveyor. Such endless conveyor has two spaced apart chains of connected links 7 (Fig. 8), with transverse equally spaced parallel rods 8 between the links as shown in Fig. 8. A fabric member or canvas 9 is threaded through the chain passing, in the upper run of the chain, over a number of successive rods 8, then underneath one of said rods, thence again over a successive number of the rods 8, and again underneath one of the rods. The rod underneath which the fabric member 9 passes in the upper run of the chain, indicated at 8a, is always at the outer side of the conveyor in both upper and lower runs of it as shown in Fig. 2. The rod 4 within the loop 3 of an apron 2 is brought underneath an outer rod 8a (Fig. 6) and passed back of it, thus detachably connecting the apron at such rod carrying end of it to the conveyor.

Such conveyor is mounted above and at one end of a doughnut cooking machine the supporting housing structure of which is indicated at 10 (Fig. 1). Within such supporting housing 10 a cooking tank 11 is located, within which melted grease or fat at a high temperature is held, the cooking liquid being shown at 12 in Fig. 2. An endless conveyor is mounted in the tank 11 on suitable wheels and on cross shafts at opposite ends of the tank 11 one of which shafts is shown at 13. Such endless conveyor includes spaced chains 14 with spaced transverse bars 15 between them (Figs. 2 and 3). In the upper run of the conveyor chains 14 in the tank, the bars 15 are positioned partly above and partly below the upper level of the high temperature cooking liquid 12, and are spaced such that the delivery of raised doughnuts 6 is timed for those carried on one section of the apron 1 between their side boundaries 5, to be delivered into the space between two consecutive cross bars 15 of the tank conveyor.

Shaft 13, as shown in Fig. 1 on which the chains 14 are mounted is continuously driven by means of a sprocket wheel 16 on the shaft and an endless chain 17 around the wheel, which in turn is driven from an electric motor 18 through a belt 19 and suitable transmission pulleys and wheels on a shaft 20, for driving such shaft from the motor and driving the chain 17 from the shaft.

The conveyor chains having the links 7 and the cross rods 8 are mounted between spaced sides or housings 21 and extend outwardly from an end of the supporting housing 10 of the doughnut cooking machine. Shafts 22 and 23 with wheels thereon to carry the conveyor are at the inner and outer end portions of the housing sides 21. The outer shaft 23 as shown in Fig. 1 is equipped with tension adjusting means of a well-known type to maintain the doughnut conveyor in suitable taut condition. A sprocket wheel 24 is at one end of the inner shaft 22, and is driven by an endless chain 25 which passes around a driving sprocket wheel 26 on the motor driven shaft 20.

At the inner end of the conveyor and slightly below its upper run a horizontal shaft 27 is mounted which is continuously driven by an endless chain 28, in turn continuously driven by an endless chain 29 which is driven from the shaft 22, suitable chain wheels as indicated at 30 together with one shown at the end of the shaft 27, around which the chain 28 passes, providing means for continuously driving the shaft 27 wherever the motor 18 is running.

Immediately below and slightly inward from the shaft 27 a hollow transverse rod 31 is located and mounted, connected with which is an inclined plate 32 which extends downwardly and inwardly, its lower edge coming to the cooking tank 11. The plate 32 over the hollow rod 31 has a plurality of small outlet openings 33 therein transverse of the plate and lengthwise of the rod 31 (Fig. 2). Grease or other cooking fat from the tank 11 is continuously applied to the hollow rod 31 when the machine is in operation. A pipe 34, connected with one end of the hollow rod 31, is connected with a pump 35 the supply to which is a pipe 36 between it and the tank 11 (Fig. 1). The pump 35, which is a rotary pump, is driven by a belt 37 from the motor driven shaft 20. Therefore, the hot grease or fat in liquid condition is continuously pumped from the bottom of the tank 11 in the limited amounts that will pass through the small openings 33, the upper side of the plate 32 being thus lubricated so that when the raised doughnuts 6 drop on it, they will not stick to the plate but will always slide downwardly by gravity into the cooking tank.

In operation, a doughnut carrying apron 2 with its pallet support 1 underneath it is carried to the machine and the projecting end of the apron connected with the upper run of the conveyor chain as shown in Fig. 2. The pallet 1 may be withdrawn or, with the movement of the conveyor chain, the apron will be drawn from the pallet. The apron is carried to and around the inner end of the conveyor and being connected therewith will move to the under side of the conveyor as shown in Fig. 2. The doughnuts 6 in such movement come to the rotating rod 27 which is rotating clockwise (Fig. 2) whereupon the doughnuts are moved by the rotating shaft 27 over it and delivered to the inclined feed plate or chute 32. On continuation of movement, all of the raised doughnuts on the apron 1 will be delivered to the cooking tank. The apron 2 after it has passed far enough to the under side of the conveyor that its free end is away from the doughnut machine, drops by gravity to take a vertical position as shown in Fig. 7. It is thereupon ready for removal from the conveyor by disconnecting it by moving the rod 4 and the loop 3 between the rod 8a with which associated and the endless fabric or canvas 9. Thereupon the apron is ready to be again placed over its pallet 1 to again receive the doughnuts and hold them during the time that they are raising.

It is evident that the aprons 2 supported by their respective pallets are carried to the conveyor in succession after the doughnuts have raised, and are thereupon fed to the cooking tank or kettle 11, lengthwise of which they are conveyed by the cross bars 15 engaging with a simultaneously delivered number of doughnuts 6. The movement of the conveyor chains 14 and of the cross bars 15 is timed so that, between successive bars 15, there will be a delivery of a series of raised doughnuts from a section of the apron 1, the sections of which are defined by the side boundaries at 5.

The structure is novel, very practical, and efficient in operation.

The invention is defined in the appended claims which are to be considered comprehensive of all forms of structure which come within their scope.

I claim:

1. In a machine of the class described, a tank for the reception of doughnuts to be cooked therein, an endless conveyor at one end of the tank and at the upper side, extending away from the tank, a transverse shaft mounted at the inner upper end portion of said conveyor, a flexible apron adapted to be placed upon the upper run of the conveyor upon which doughnuts or the like in spaced series are adapted to be placed, means for detachably connecting one end of the apron to said conveyor, means for simultaneously driving said conveyor and shaft, whereby the doughnuts on said apron are carried to said shaft into contact therewith and are carried thereby over said shaft to the adjacent end of the tank, and an inclined member to which the doughnuts are delivered from said shaft, having its lower portion reaching to the tank adjacent said end thereof.

2. A structure as defined in claim 1, said conveyor comprising, two endless spaced apart chains, spaced rods between them and an endless fabric member threaded through said rods, at spaced intervals passing inside a rod and between said intervals over the rods between.

3. A structure as defined in claim 1, a hollow rod located below said shaft to which rod said inclined member is attached at its upper portion, extending downwardly and at an angle to the vertical therefrom to said tank, said inclined member at its upper edge portion over said rod having a plurality of passages therethrough, and means for continuously pumping liquid to said hollow rod to pass through said passages to the upper surface of and down said inclined member.

4. A structure as defined in claim 3, said tank being adapted to contain doughnut cooking liquid therein, said means for continuously pumping liquid to said hollow rod comprising a continuously driven pump, connections between said pump and tank for withdrawing liquid from the tank, and connections between said pump and the hollow rod for pumping said liquid to the rod.

5. In a structure as described a conveyor for delivering doughnuts or other food articles to a cooking mechanism therefor comprising, spaced parallel shafts, spaced endless chains on said shafts, rods spaced from each other connected at their ends to said chains, and an endless fabric member threaded through said rods at intervals passing at the inner side of a rod and thence at the outer side of a number of the rods and thence at the inner side of the next rod, whereby in the length of the conveyor a plurality of rods at spaced apart distances in the length of the conveyor are located at the outer side of the fabric member and all other rods at the inner side thereof.

6. A structure as defined in claim 5, and a fabric apron adapted to be placed upon said conveyor, and means at one end of the apron for detachably connecting with one of the rods located at the outer side of said fabric member on the conveyor.

7. A structure as defined in claim 6, said means comprising a rod located at an end of the apron transversely thereof and permanently secured thereto adapted to be attached to said conveyor by forcing said last mentioned rod on the apron underneath a selected rod on the conveyor and back thereof.

8. In a doughnut machine, a horizontal tank for holding a quantity of high temperature cooking liquid, a generally horizontal conveyor at one end of the tank extending away therefrom, aprons adapted to have placed thereon a plurality of spaced series of articles to be cooked transversely of the apron, means at one end of each apron for detachably connecting it to said conveyor, an inclined plate located at the inner end of the conveyor extending downwardly and away therefrom into the upper portion of the adjacent end of the tank, a transverse shaft mounted for rotation at the upper edge of said plate and adjacent said conveyor and means for continuously driving said shaft and conveyor.

9. In a structure as defined in claim 8, a pump, means for continuously driving said pump simultaneously with the driving of said shaft and conveyor, and connections between said pump and tank and the pump and upper portion of said plate for pumping cooking liquid from the tank and delivering it to the upper side of said inclined plate.

HAROLD F. STOCK.

No references cited.